United States Patent [19]
Resetarits et al.

[11] Patent Number: 5,382,390
[45] Date of Patent: Jan. 17, 1995

[54] MULTIPLE-DOWNCOMER FRACTIONATION TRAY WITH VAPOR DIRECTING SLOTS AND EXTENDED DOWNCOMER BAFFLES

[75] Inventors: Michael R. Resetarits, Depew; Michael J. Lockett, Grand Island, both of N.Y.

[73] Assignee: UOP, Des Plaines, Ill.

[21] Appl. No.: 188,181

[22] Filed: Jan. 28, 1994

Related U.S. Application Data

[63] Continuation-in-part of Ser. No. 779,216, Oct. 18, 1991, abandoned, which is a continuation-in-part of Ser. No. 579,502, Sep. 10, 1990, abandoned.

[51] Int. Cl.[6] .............................................. B01F 3/04
[52] U.S. Cl. .............................................. 261/114.3
[58] Field of Search .............................................. 261/114.3

[56] References Cited

U.S. PATENT DOCUMENTS

| | | | |
|---|---|---|---|
| 3,045,989 | 7/1962 | Kittel | 261/114 |
| 3,282,576 | 11/1966 | Bruckert et al. | 261/114 |
| 3,410,540 | 11/1968 | Bruckert | 261/113 |
| 3,417,975 | 12/1968 | Williams et al. | 261/114 |
| 3,550,916 | 12/1970 | Hoppe et al. | 261/114 |
| 3,759,498 | 9/1973 | Matsch | 261/114 JP |
| 4,065,528 | 12/1977 | Slobodyanik | 261/114 R |
| 4,101,610 | 7/1978 | Kirkpatrick et al. | 261/110 |
| 4,174,363 | 11/1979 | Bruckert | 261/114 TC |
| 4,499,035 | 2/1985 | Kirkpatrick et al. | 261/114 JP |

FOREIGN PATENT DOCUMENTS

| | | | |
|---|---|---|---|
| 785739 | 5/1968 | Canada | 196/141 |
| 2027505 | 10/1970 | France | 261/114.3 |
| 510247 | 3/1974 | U.S.S.R. | 175/202 |
| 747479 | 4/1976 | U.S.S.R. | 261/114.3 |

OTHER PUBLICATIONS

"Ballast Tray Design Manual", Glitsch, Inc., Bulletin No. 4900–Fourth Edition, Feb. 1984.

*Primary Examiner*—Tim Miles
*Attorney, Agent, or Firm*—Thomas K. McBride; John F. Spears, Jr.

[57] ABSTRACT

The vapor capacity of multiple downcomer type fractionation trays is increased by the provision of vapor directing slots in the tray deck, with the slots being oriented toward the closest downcomer to reduce froth height. The slots located in the relatively narrow deck area between downcomers are accordingly divided into two sets which point in opposite directions. Vertical baffles are provided above the downcomer inlets. The baffles preferably extend upward to slightly below the lower surface of the next higher tray, with the upper edge of the baffles being notched to accommodate the downcomers of this next higher tray.

11 Claims, 5 Drawing Sheets

MULTIPLE-DOWNCOMER FRACTIONATION TRAY WITH VAPOR DIRECTING SLOTS AND EXTENDED DOWNCOMER BAFFLES

CROSS REFERENCE TO RELATED APPLICATIONS

This application is a continuation-in-part of our prior copending application Ser. No. 07/779,216 filed Oct. 18, 1991, now abandoned which was a continuation-in-part of our now abandoned application Ser. No. 07/579,502 filed Sep. 10, 1990, now abandoned. All of the teachings of our prior applications are incorporated herein by reference.

FIELD OF THE INVENTION

The invention relates to the design and construction of vapor-liquid contacting apparatus. The invention therefore relates, for example, to apparatus used within fractional distillation columns to perform separations of volatile chemical compounds, and the invention specifically relates to apparatus used as fractional distillation or contacting trays.

RELATED ART

Fractional distillation trays are widely employed in the hydrocarbon processing, chemical, and petrochemical industries. Accordingly, a large amount of research, development, and creative thickening has been devoted to providing improved fractional distillation trays. Fractionation tray development has therefore provided many variation in contacting area structure, downcomer design, and overall tray structure.

Most trays have circular perforations evenly distributed across the contacting surface (decking) of the tray. These allow the rising vapor to flow straight upward from the tray's surface. A small subset of fractional distillation trays utilize mechanical means for directing the vapor in a specified direction as it passes upward through the contacting area of the tray. On example of this provided in U.S. Pat. No. 3,045,989 issued to W. Kittle. This reference shows perforations, which can be considered to be slot-like in nature, as a means to use rising vapor to direct the horizontal liquid flow in various directions depending upon specific embodiments. In FIG. 4A the slots are oriented in diametrically opposite directions in order to promote the convergence of the liquid flow at an outlet downcomer 118'.

U.S. Pat. No. 3,550,916 issued to Kalus Hoppe et al. shows slot-like openings on the active surface area of a fractionation tray deck being oriented to direct rising vapor flow in the direction of the outlet downcomer associated with the tray. U.S. Pat. No. 4,065,528 issued to Ivan P. Slobodyanik shows another arrangement for fractiontion trays wherein slots are provided in the decking of the tray to direct the direction of gases emerging from the slots and thereby direct liquid flow in desired patterns over the tray. In this instance the liquid flows in alternate centrifugal and centripetal patterns. An objective of the invention is to insure a uniform distribution of liquid across the contact plate.

U.S. Pat. No. 3,282,576 to W. Bruckert et al. teaches, as exemplified in column 5, that slots may be placed across the surface of a cross-flow sieve tray to promote the flow of liquid across the tray without the aid of liquid gradients. The thrust directing openings of the slots are arranged in parallel rows and generally face the liquid outlet of the tray. U.S. Pat. No. 3,417,975 to B. Williams et al. teaches another variation in fractionation tray design in which the decking portion of the tray comprises both circular perforations and also flow directing slots. The slots shown in FIG. 1 of this reference and in FIG. 3 of the above-cited Bruckert et al. reference are similar in nature to those which may be employed in the subject invention. In the apparatus of the Williams et al. reference, the flow-directing slots are spaced unevenly across the decking to provide a higher concentration of the slots near the periphery of the tray.

U.S. Pat. No. 3,795,498 issued to L. C. Matsch teaches another fractionation tray deck arrangement in which both circular perforations and vapor-directing slots are employed. The arrangement of the slots is intended to increase liquid velocity in the peripheral portions of the tray which do not lie on a direct flow path between the inlet and outlet downcomers. The orientation of the slots directs liquid into and removes liquid from this otherwise stagnant area therefore promoting the overall efficiency of the tray. It is to be noted that this tray like the trays cited above does not comprise a multiple downcomer tray having relatively closely spaced downcomers which are not troubled by uneven flow patterns.

U.S. Pat. No. 4,101,610 issued to R. D. Kirkpatrick et al. shows a cross-flow fractionation tray having decking which comprises both circular perforations and flow-directing slots. The flow-directing slots are arranged to direct the liquid across the tray towards the outlet downcomer. The intent is to decrease stagnant areas upon the surface of the tray and to reduce the liquid gradient across the tray.

U.S. Pat. No. 4,499,035 issued to R. D. Kirkpatrick et al. shows another arrangement on the surface of cross-flow vapor-fluid contacting trays which employ both circular perforations and the vapor-directing slots on the decking panels of the tray. This reference is specific to the provision of forth initiation or bubble-promoting means at the liquid entrance to the tray decking area from the inlet downcomer.

It may be noted from the above description that the function of the vapor directing slots is different in the subject tray from the function of the slots used in the above cited references. In the references one basic use of the slots is to reduce liquid gradients across the tray which can result from long liquid flow paths. Another basic function of vapor directing slots in the prior art was to push liquid into and out of deck areas which were out of the immediate flow path between the inlet and outlet downcomers. The distinctive structure of multiple downcomer trays eliminates these two reasons to employ vapor directing slots in the tray decking.

Canadian patent 785,739 issued to L. C. Matsch et al. is believed pertinent for the tray decking structure shown in FIGS. 3a and 3b. The tray surface depicted in these figures has vapor-directing slots positioned in various directions including slots facing diametrically opposite directions. The tray employs slots to promote liquid flow across the tray and to prevent or lessen liquid height gradients from being established upon the surface of the tray.

The use of "anti-jump" baffles located above the inlet to an outlet downcomer is known in the art as illustrated by FIG. 10 in the ballast tray design manual issued by Glitsch Incorporated (Bulletin No. 4900-fourth edition, copyright 1974).

U.S. Pat. No. 3,410,540 issued to W. Bruckert is believed pertinent for its showing of the structure of a prior art multiple downcomer tray employing the highly distinctive downcomer design similar to that employed in the subject tray.

U.S. Pat. No. 4,174,363, also issued to W. Bruckert, discloses a design for small metal enclosures which are bolted to the upper surface of trays to encourage the flow of stagnant liquid away from the wall of the column toward the active area of the tray. This reference shows these devices being used on cross-flow and on Multiple Downcomer trays such as employed in the subject invention. The reference also shows the usage of flow-directing slots on the active deck surface of a cross-flow tray.

Soviet Union Patent Publication 747-479 of Apr. 12, 1976 (338655) illustrates a cross-flow tray in which valves which allow vapor to pass upward through the tray deck are shaped so to direct the vapor in a variety of directions. The valves nearest the outlet direct vapor toward the outlet. Soviet Union Patent Publication 510-247 of Mar. 20, 1974 (007530) illustrates the use of flow-directing slots on several points on the surface of a cross-flow tray. The slots direct vapor toward the outlet downcomer.

French Patent Application No. 2,027,505 filed Jan. 9, 1969 (National Registration No. 69.00088) describes a cross-flow fractionation tray having a deck material having "oblique recesses" similar to the flow directing slots of the subject invention. The claimed invention of this reference is a structure for the deck material which uses the vapor streams rising through a multitude of "round recesses" to intercept and delay the flows induced by the oblique recesses. The purpose of this is to retard the flow of fluids to the tray outlet and increase residence time on the tray and thus increase the efficiency of the tray. As shown below, the slots of the subject apparatus are employed to increase capacity while maintaining equal efficiency.

BRIEF SUMMARY OF THE INVENTION

The invention is an improved multiple downcomer tray, as opposed to the more widely used cross-flow trays, which provides an increase in vapor capacity. The invention appears to function by reducing froth height and lowering liquid entrainment in the vapor rising toward higher trays. In the invention vapor-directing slots are placed on the relatively narrow decking areas located between adjacent downcomers to direct vapor towards the nearest downcomer. Preferably the slots will be pointed toward the closest downcomer. The trays also comprise an anti-jump baffle located above the downcomer inlet to prevent droplets of liquid from being tossed over the downcomer to a different portion of decking. This baffle extends upward between the descending downcomers of the next higher tray.

One embodiment of the invention may accordingly be characterized as an apparatus for performing fractional distillation which comprises vertically aligned upper first and a lower second vapor-liquid contacting trays, each tray having a generally circular circumference, and comprising: (i) at least two narrow, trough-shaped downcomers which are parallel to each other and equidistantly spaced across the tray, each downcomer being formed by two opposing side walls and two end walls which are shorter than the side walls, the side walls and end walls oriented perpendicular to the plane of the tray, each downcomer having a liquid sealable outlet means; and, (ii) a plurality of elongated vapor-liquid contacting decks, with a vapor-liquid contacting deck being located adjacent each downcomer side wall such that the tray has at least one more vapor-liquid contacting deck than downcomer means; with perforations being substantially evenly distributed across the entire surface provided by the vapor-liquid contacting decks and with at least a portion of said perforations being in the form of vapor flow directional slots having openings facing a downcomer side wall; with the apparatus being further characterized in that the downcomers of the second tray are perpendicular to those on the first tray and in that each tray comprises a plurality of anti-jump baffles comprising a vertical plate centrally mounted over the downcomers of the tray and parallel to the downcomer sidewalls, with the anti-jump baffles of the lower second tray having notches which surround the bottom portion of downcomers of the upper first tray.

DESCRIPTION OF PREFERRED EMBODIMENTS

Vapor-liquid contacting devices are used in a wide variety of applications for bringing into contact a liquid, which flows in a generally downward direction in the overall device, with a rising vapor stream. For instance, the device is widely used to contact a gas stream with a treating liquid which selectively removes a product compound or an impurity from the gas stream. The subject apparatus can therefore be used in an acid gas absorber or stripper or in an ethylene oxide absorber. Another application of vapor-liquid contacting apparatus is in the separation of chemical compounds via fractional distillation. The apparatus of the subject invention can therefore be used in a variety of vapor-liquid contacting roles. The discussion herein is primarily in terms of use in a process for separation by fractional distillation, but this is not intended to in any way to restrict the invention to that mode of operation.

The subject apparatus can be used in the separation of essentially any chemical compound amenable to separation or purification by fractional distillation. Fractionation trays are widely used in the separation of specific hydrocarbons such as propane and propylene or benzene and toluene or in the separation of various hydrocarbon fractions such as LPG (liquified petroleum gas), naphtha or kerosene. The chemical compounds separated with the subject apparatus are not limited to hydrocarbons but may include any compound having sufficient volatility and temperature stability to be separated by fractional distillation. Examples of these materials are acetic acid, water, acetone, acetylene, styrene acrylonitrile, butadiene, cresol, xylene, chlorobenzenes, ethylene, ethane, propane, propylene, xylenols, vinyl acetate, phenol, iso and normal butane, butylenes, pentanes, heptanes, hexanes, halogenated hydrocarbons, aldehydes, ethers such as MTBE and TAME, and alcohols including tertiary butyl alcohol and isopropyl alcohol.

Two determinants of the quality of a contacting tray are its efficiency for performing a separation and its capacity in terms of liquid or vapor traffic. It is an objective of the subject invention to increase the capacity of multiple-downcomer trays.

Often the capacity of a fractionation tray is limited by its ability to handle increased rates of upward vapor flow through the tray. This limitation is normally associated with the tendency of the liquid "on" the tray to be entrained in rising vapor and to rise upward towards the next tray. The vapor capacity of a tray is therefore often reached when the height of the "froth" upon an upper surface of the tray reaches the bottom surface of the next above tray. An excessive froth height on a fractionation tray, or any type of contacting tray, can cause liquid to pass upward through the decking of the above tray. Liquid is then passed upward. A decrease in the froth height may accordingly be desirable to increase tray vapor capacity. It is therefore another objective of the subject invention to reduce the froth height present on a multiple downcomer tray.

Before proceeding further with a description of the invention, it is useful to define and characterize the type of tray referred to herein as a "multiple downcomer-type" tray. This term is used herein to distinguish the subject invention from other types of fractionation trays.

A multiple downcomer tray is distinguished from the conventional crossflow tray by several structural characteristics. First, a multiple downcomer tray does not have a "receiving pan". This is the normally imperforated section located below an inlet downcomer opening. Reference is made to previously cited U.S. Pat. No. 3,550,916 to Klaus Hoppe which illustrates a receiving pan 1 in FIG. 1. This is the imperforate space upon which the liquid descending through the downcomer impacts before passing onto the decking of the tray. Often the receiving pan is separated from the decking or "active" area of the tray by an inlet weir. Receiving pans are therefore normally located directly below the downcomer leading from the next above conventional cross-flow fractionation tray.

Multiple downcomer fractionation trays do not have receiving pans. That is, the horizontal surface area of a multiple downcomer fractionation tray is basically divided into downcomer means and vapor-liquid contacting area normally referred to as decking. There are no imperforate areas allocated to receiving descending liquid from the tray located immediately above.

Another distinguishing feature of multiple downcomer fractionation trays is the provision of a relatively large number of trough-like downcomer means across the tray. These downcomer means are spaced relatively close together compared to the customary crossflow fractionation trays. The distance between adjacent downcomers (measured between their sidewalls or weirs) of the same tray is normally between 0.3 and 1.0 meters and will often be less than 0.5 meter. This results in the multiple downcomer tray having a unique design when viewed from above consisting of the alternating decking areas and downcomer means evenly spaced across the upper surface of the fractionation tray, as for instance shown in FIG. 1.

The actual downcomer means of a multiple downcomer tray are also unique compared to the downcomers employed upon normal cross-flow fractionation trays. The downcomer means do not extend downward to the next fractionation tray. Rather they stop at an intermediate distance located between the two trays. The downcomer descending from the tray above therefore stops well above the top or inlet to the downcomers of the tray below. The top or inlet to the downcomer of a tray often functions as the outlet weir of the tray, and it is therefore seen that the bottom of the downcomer of a multiple downcomer tray above is well above the outlet weir of the tray located below.

Downcomers on a multiple downcomer tray are normally oriented at 90 degrees from the trays located immediately above and below. The downcomers on vertically adjacent multiple downcomer trays are therefore perpendicular rather than parallel.

Yet another distinguishing feature of multiple downcomer fractionation trays is the provision of a liquid sealable means in the bottom or outlet of the downcomer means. The bottom of the downcomer means is therefore partially closed off by a plate having various perforations or by some other means intended to retard the direct downward flow of liquid out of the downcomer means. Reference is made to the detailed description of FIGS. 4 and 5 for further information on this. This liquid sealable outlet is located well above the deck of the tray located immediately below and is at a point above the inlet of the downcomers associated with this next lower tray. The descending liquid is collected in the lower portion of the downcomer means and spills forth upon the next lower tray through these openings or other mechanical arrangement.

Figure 2:
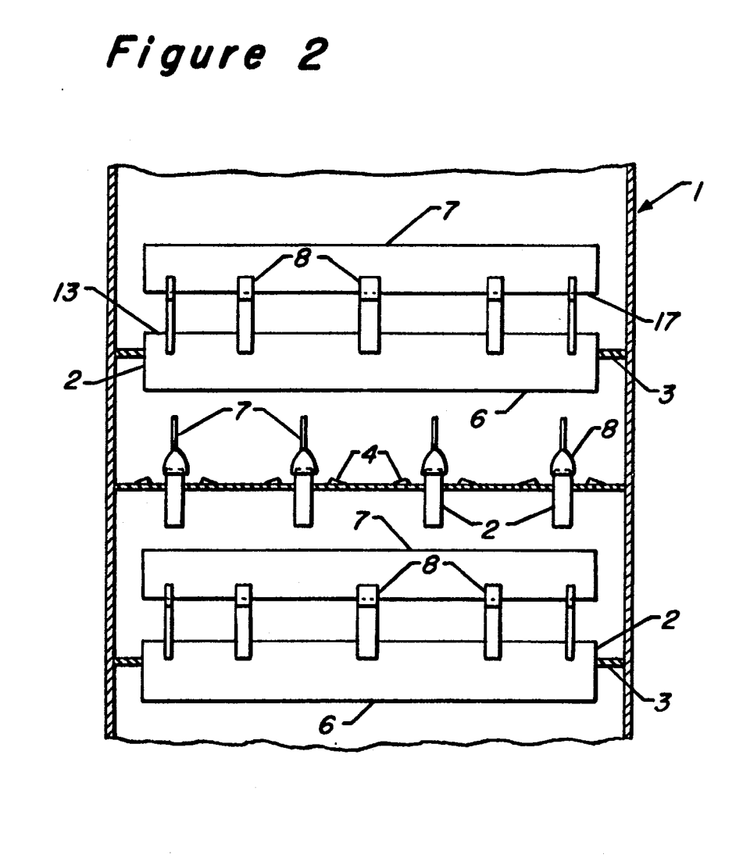
FIG. 2 is a cross-sectional view taken on a vertical plane through a fractional distillation column 1 employing a slightly different embodiment of the trays of the subject invention.

There is no inlet weir at the bottom of the downcomer of the subject multiple downcomer trays as in a cross-flow tray. The liquid sealable outlet performs this function. Reference is made to FIG. 2 which shows this arrangement.

Multiple downcomer trays are characterized by a very short liquid flow path between the point at which the liquid first falls on the tray and the point at which the liquid exits the tray via the downcomer means. This is due primarily to the close spacing of the downcomers as described above. Except for between the column wall and the end downcomers, liquid descending from the tray above will fall to the surface of a tray at a point midway between two adjacent downcomers. The distance from the point of liquid reaching the tray to the downcomer inlet is therefore always less than one-half of the distance between downcomers for most of the liquid. This short distance the liquid must travel coupled with the agitation attendant with the passage of vapor upward through the decking results in multiple downcomer trays having essentially no liquid level gradient from the liquid inlet to exit points.

The directional slots shown in the previously cited cross-flow tray references are employed to promote liquid flow across the surface of the tray. This is done to eliminate stagnant areas, uneven residence times and liquid level gradients. Multiple downcomer trays suffer from none of these maladies and therefore do not require the use of directional slots as a remedy to these cross-flow tray problems. The slots are instead used to increase vapor capacity.

With the distance between downcomer walls (the width of a decking section) being between 1 and 0.3 meters, the average liquid flow path would be less than 0.5 to 0.15 meters.

The physical size of any portion of a multiple downcomer tray must be chosen by a skilled designer considering all aspects of the intended operation of the tray. The following are measurement ranges of commercially employed multiple downcomer trays which are presented for the dual purposes of providing guidance in the design and use of the subject apparatus and for distinguishing the multiple downcomer trays of the subject invention from the conventional cross-flow fractionation tray. The spacing between vertically adjacent trays would normally be between 20 and 91 centimeters (8–36 inches) and is preferably between 25–61 centimeters (10–24 inches). The total open area of the deck is generally in the range of about to about 5 to 15 percent of the deck area. This includes the open area provided by both circular openings and elongated slots of the present invention in the decking area of the tray. The normal hole diameter of the circular perforations may range from about 0.3 to about 2.6 centimeters (⅛–1.0 inches). A hole size of about 0.47 to about 0.64 centimeters (3/16–¼ inch) is normally preferred. The open area provided by slots is preferably from about 0.25 about 5 percent of the area of the deck. A representative thickness of the checking is about 0.19 centimeters (0.075 inches) to 0.34 cm.

The inlet openings of the downcomers of a multiple downcomer tray are normally about 6 to about 25 cm wide (2.5–10 inches). The height of a downcomer as measured from the horizontal top edge of the outlet weir to the bottom of the liquid sealable means is normally between about 15.2 to about 45.7 centimeters (6–18 inches). This includes the height that the downcomer extends above the decking and below the decking. The anti-jump baffle located above the downcomer would normally be at least 7.5 centimeters tall and maybe up to 35.6 centimeters in height (3–14 inches) and will normally be approximately equal in length to the associated downcomer means. Further information on the arrangement and variations of the elements of a multiple downcomer tray may be obtained by reference to U.S. Pat. No. 3,410,540 which is incorporated herein by reference.

The subject invention achieves the objective of increasing the vapor capacity of a multiple downcomer tray through the provision of a number of vapor-directing slots in the decking section of the fractionation tray. The slots are oriented such that the gas rising upward through the deck through these slots imparts a horizontal thrust or momentum to the liquid or froth on the tray in the direction of the nearest downcomer means. A multiple downcomer fractionation tray would typically have at least two downcomer means, but smaller trays can have a single downcomer. Therefore, each multiple downcomer tray will normally have at least one section of decking which has downcomer means along each lateral side. The slots on the portions of deck having downcomers on two sides will therefore have slots oriented in diametrically opposite direction towards the nearest downcomer means.

This unique structural design has the novel function of directing the froth towards and into the downcomers of the multiple downcomer tray. In comparison, the prior art slots are employed to direct liquid flow across the relatively lengthy flow paths of cross-flow trays to reduce liquid gradients or to eliminate stagnant areas.

The vapor rising upward through the slots leaves the slots at an angle to the tray surface having a definite horizontal component and imparts some of the horizontal momentum of the vapor to the liquid phase or suspended droplets above the deck surface. This results in a net force pushing the froth towards the downcomer means. There is therefore achieved a more rapid passage of the froth into the downcomer means and a decrease in the froth height on the tray.

The agitation which occurs upon the decking can cause erratic and sometimes very powerful horizontal movement of suspended liquid droplets. It is therefore preferred that "anti-jump" baffles be placed over the inlet of the downcomer means in order to prevent the passage of liquid across the inlet to the downcomer. It is the function of the anti-jump baffle to intercept liquid passing horizontally over the downcomer inlet and to direct this liquid into the downcomer. Basically the anti-jump baffle absorbs the horizontal momentum of the liquid particles which may otherwise carry it over the baffle and allows the liquid to fall by the action of gravity into the downcomer inlet. The provision of the anti-jump baffles has been found to be a positive enhancement to the structure of the tray and useful in achieving the objectives of the invention. However, the provision of the anti-jump baffle is an optional feature and may be totally eliminated.

Figure 1:
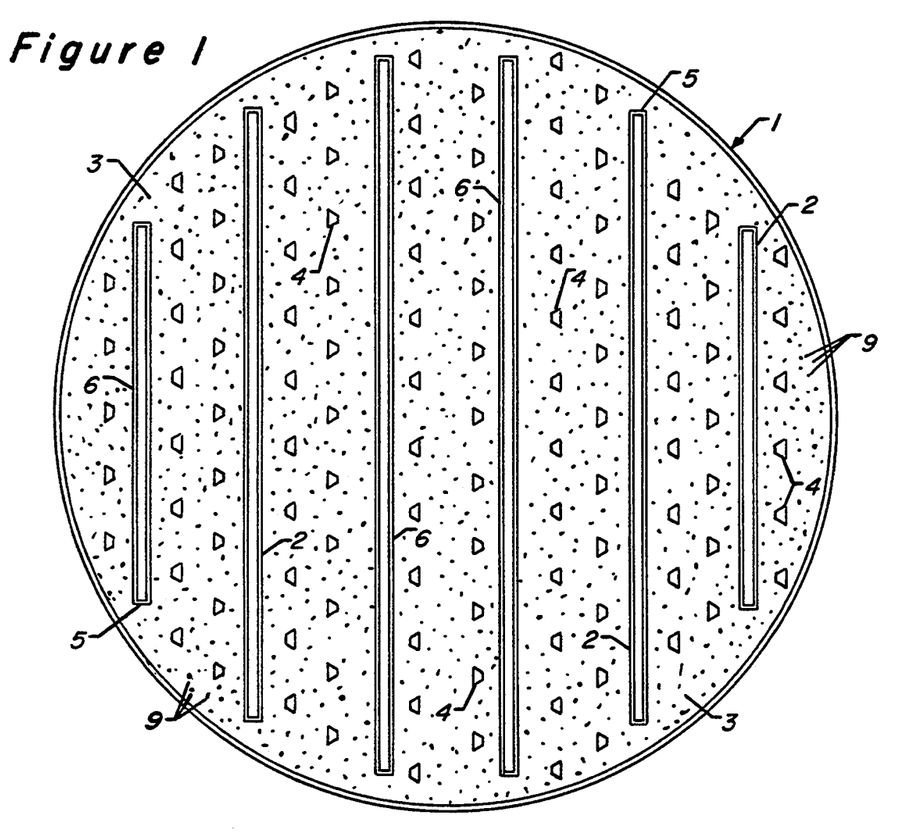
FIG. 1 is the view seen looking downward toward one embodiment of the subject fractionation tray. The parallel downcomers 5 are arranged between the vapor-liquid contacting decks 3.

A more complete understanding of the subject invention may be obtained by reference to the drawings. FIG. 1 shows the view seen looking downward toward the upper surface of a multiple downcomer tray. The particular tray represented in this drawing has six downcomers and is surrounded by the cylindrical wall of the fractionation column 1. Each downcomer means 2 is comprised of two downcomer end walls 5 and two parallel side walls 6. The downcomers are uniformly spaced across the tray. Located between the downcomers is the perforated decking or deck 3 portion of the tray. Decks also extend between the extrememost downcomer means and the outer periphery of the tray. That is, the portion of the tray enclosed between the end downcomers and the perimeter of tray is also filled with perforated decking and has active vapor-liquid contacting means placed thereon. The decks will comprise both the standard symmetrical (circular) perforations 9 which are uniformly distributed across the decking surface and the vapor-directing slots 4. The slots and perforations are not drawn to scale in order to show detail.

As shown in the drawing, the slots located on a decking section located between any adjacent pair of downcomer means are divided into two groups oriented in diametrically opposite directions. Vapor rising from one grouping of slots travels in a horizontal direction 180 degrees opposite from vapor rising through the second group of slots located closer to the other downcomer associated with this portion of deck. The particular tray illustrated in FIG. 1 does not employ an anti-jump baffle.

Figure 8:
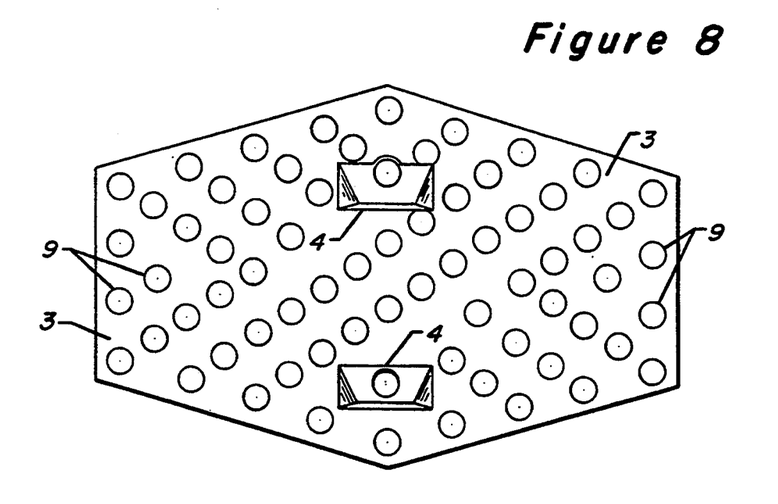
FIG. 8 is a representation of a small section of decking drawn to actual scale to illustrate the relative size and placement of suitable circular perforations 9 and vapor-directing slots 4 upon a piece of decking material.

FIG. 8 provides a pictorial representation of an actual portion of decking material 3. This Figure illustrates representative commercial sizes and shapes of the circular perforation 9 and the vapor-directing slot 4. In this instance, the openings point toward the lower end of the Figure and would direct the rising gases in a downward direction away from FIG. 1. The precise alignment or spacing of the circular perforations is not believed to be a controlling variable in the subject invention. Likewise, the placement of the flow-directing slots is not believed to be critical as long as the direction of thrust of the vapor rising through the slots imparts a horizontal momentum to the froth and liquid upon the tray in the general direction of the nearest downcomer. The slots may be arranged in straight lines or in zig-zagged rows across the surface of the tray. For convenience of presentation, only two rows of the flow-directing slots 4 are illustrated on FIG. 1. In actuality many more slots would be placed upon the decking area.

A representative maximum spacing between any two flow-directing slots is on the order of from about 5 to 17.8 centimeters (2 to 7 inches). The perforations are preferably spread in a relatively uniform manner across the entire deck area. To minimize fabrication expense the deck material is normally constructed by first perforating the deck material to provide the desired number of circular openings. A second perforation step is then performed to impart the flow-directing slots. No attempt is made to align the slot openings with or to have the slot openings fall between the circular perforations. Therefore, as shown in FIG. 8, some of the slot openings will actually fall in the same location as the circular openings and the portion of the deck material which forms the slot may also have a perforation.

FIG. 2 is a cross-sectional view looking in a horizontal direction through a fractionation column. The figure shows three multiple downcomer fractionation trays, each of which employs anti-jump baffles. This view illustrates the preferred and customary perpendicular arrangement of the downcomers on alternating trays. The uppermost tray shows the view when seen looking directly towards the side wall 6 of the downcomers. This view also shows the anti-jump baffle 7 held above the downcomer by the braces or support legs 8. One feature of the anti-jump baffle illustrated in this figure is that the bottom edge 17 of the baffle is above the upper edge 13 of the associated downcomer. This view also illustrates the customary feature of multiple downcomer trays that the downcomer means is situated with about 1/5-¼ of its total height located above tray decking to provide outlet weirs with the remainder of the downcomer means extending below the decking.

The depiction of the middle tray in FIG. 2 shows the alignment of the anti-jump baffle means parallel to the downcomer means 2. It also illustrates the orientation of the vapor directing slots 4 towards the nearest downcomer means. It may therefore be seen that the vapor-directing slots located between two adjacent downcomer means will point in opposite directions. That is, those slots located closest to a downcomer will be pointed towards that downcomer. The direction of slot orientation is therefore divided along a line intermediate between the two adjacent downcomer means which separates the slots into the two respective groupings pointed at the closest downcomer means.

Figure 3:
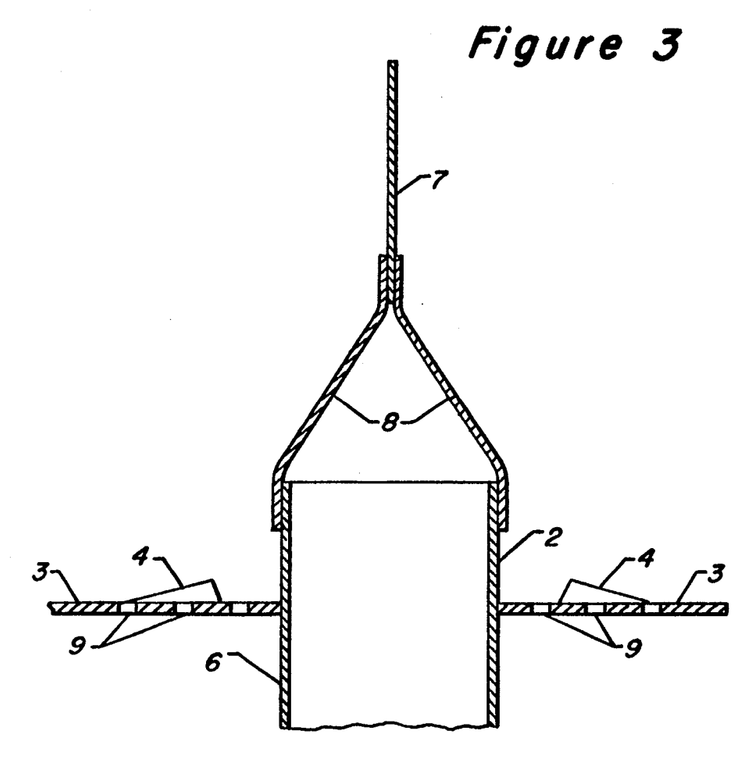
FIG. 3 is a vertical cross-sectional view of an upper portion of a downcomer 2 having an anti-jump baffle plate 7 held in a central location above its upper opening by the legs 8.

FIG. 3 is an enlargement of the upper portion of a downcomer 2 shown in FIG. 2 and a section of the associated decking material. The decking 3 is attached to the side wall 6 of the downcomer 2 by means not shown on the drawing. Typically a lower piece of "angle" stock is welded to the downcomer wall to support the decking. A second piece of "angle" stock is bolted to the wall above the decking to form a groove. The circular perforations 9 are uniformly dispersed through the decking surface. The vapor-directing slots are located on each side of the downcomer means with the opening of the slot facing the downcomer side wall 6. The liquid anti-jump baffle means 7 is supported by intermittent braces 8 which may be attached as by bolting to both the baffle 7 and the side walls 6. The anti-jump baffle is preferably centrally located between the downcomer side walls and essentially as long as the downcomer. The total height of the actual plate of baffle is at least one-third the height of a downcomer side wall. The baffle plate may be located entirely above the inlet of the downcomer but preferably extends into the downcomer as shown in FIG. 4.

Figures 4, 5, 6, 7:
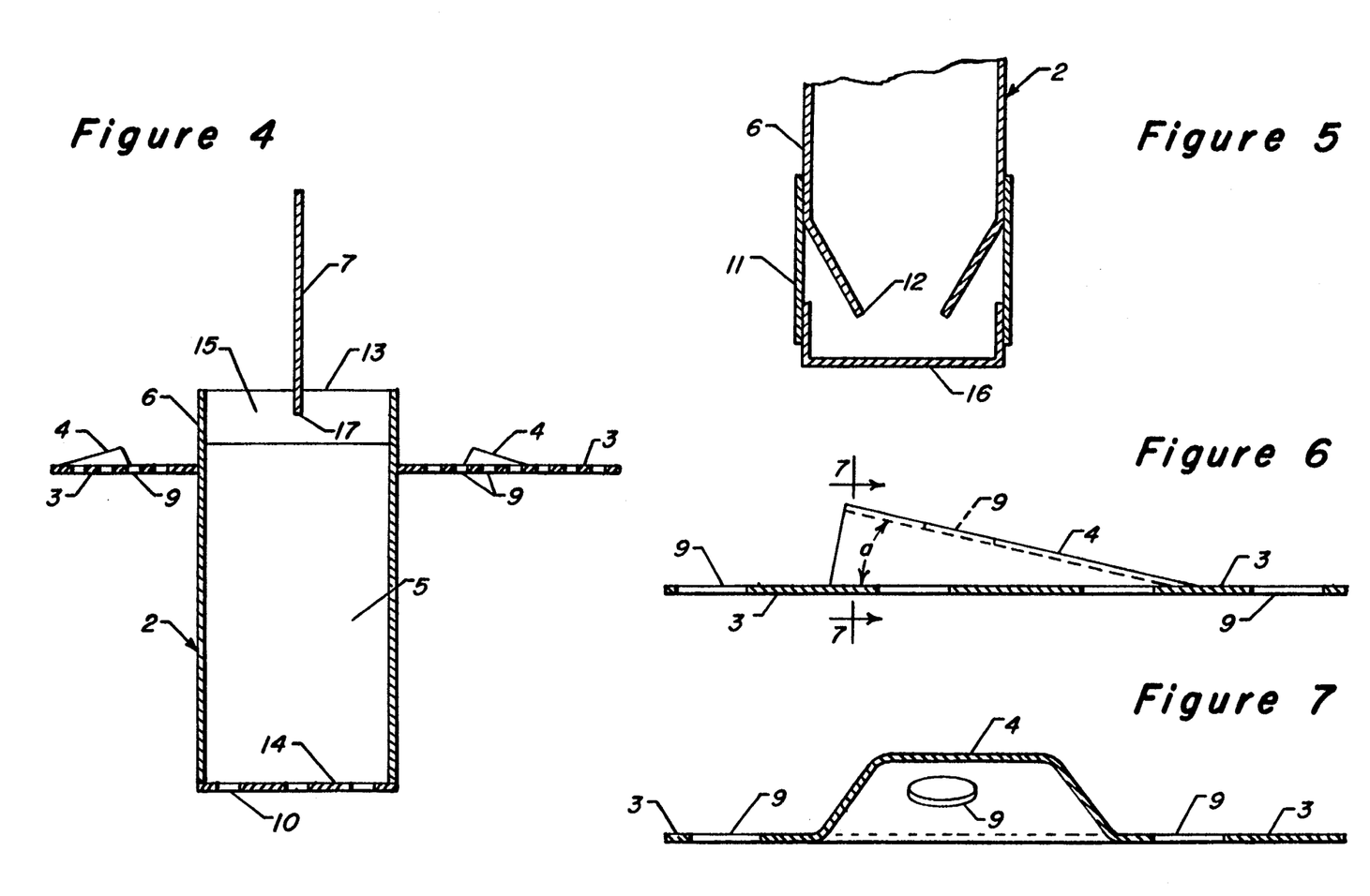
FIG. 4 is a vertical cross-sectional view showing an anti-jump baffle extending downward into a downcomer and a liquid sealable outlet means at the bottom end of the downcomer comprising a perforated bottom plate 14.
FIG. 5 is a cross section of a lower portion of a downcomer 2 illustrating an alternative construction of the liquid sealable outlet at the lower end of the downcomer comprising a seal trough 16 attached to the open bottom end of the downcomer by legs 11.
FIG. 6 is a cross section through a section of a deck 3 illustrating a side view of a vapor-directing slot 4.
FIG. 7 is a cross-sectional view of a portion of deck 3 illustrating the view along section line 7 as seen facing into the outlet of a vapor-directing slot 4.

FIG. 4 illustrates an alternative arrangement of a downcomer and an anti-jump baffle 7. The side wall of the downcomer 2 is again attached to the decking 3 as described in FIG. 3, but the anti-jump baffle 7 is supported by a bracing bar 15 bolted to the upper end of the downcomer side walls 6. The bar is perpendicular to the anti-jump baffle 7. This arrangement is preferred as it increases the rigidity of the downcomer means itself. Another feature of the arrangement shown in FIG. 4 is that the lower edge 17 of the anti-jump baffle is located within the downcomer means. That is, the lower edge of the anti-jump baffle is below the upper edge 13 of the downcomer inlet and a lower portion of the baffle is located within the downcomer. The baffle may extend downward to the level of the decking. This figure also illustrates one of the several alternative ways in which the bottom surface of the downcomer means 2 may be constructed. In this embodiment a bottom plate 14 connects the two side walls 6. A number of relatively large openings or perforations 10 are provided in the bottom plate 14 for the purpose of allowing the rapid exit of the liquid which accumulates within the downcomer. The purpose of the plate 14 is to retard the liquid flow sufficiently that the bottom of the downcomer means is sealed by liquid to the upward passage of vapor.

Figure 9:
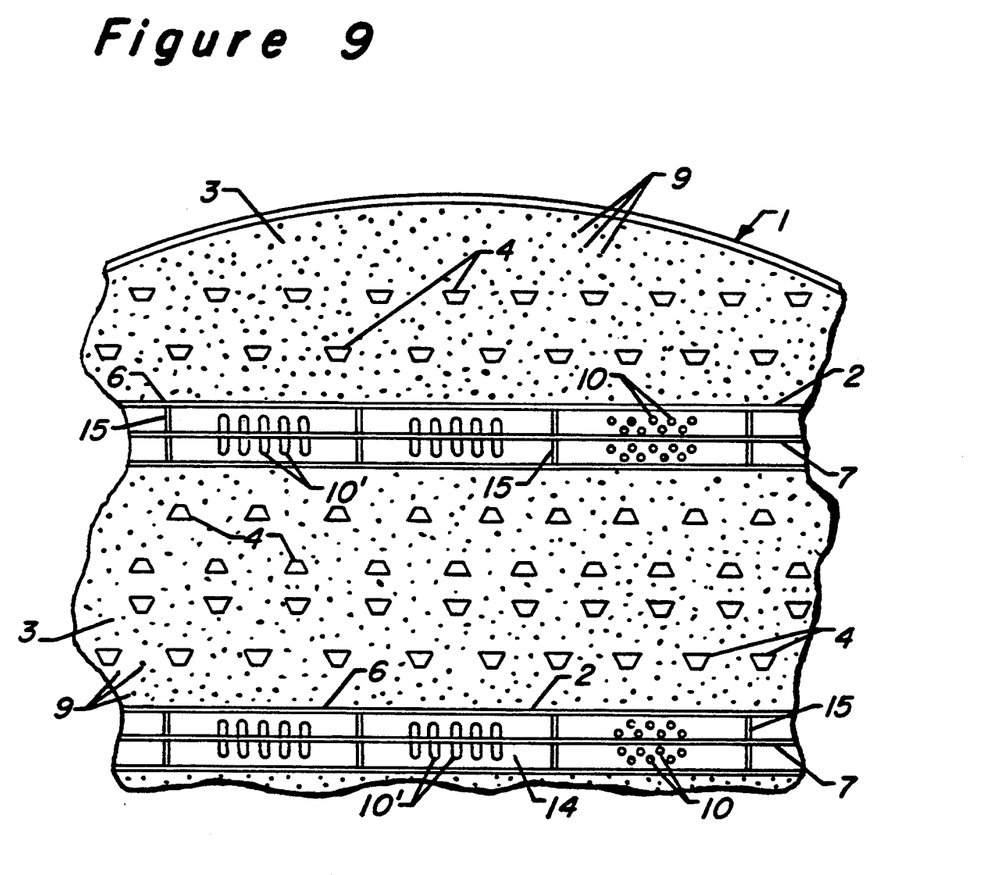
FIG. 9 is a cross-sectional view of a fractional distillation column 1 looking downward upon a multiple downcomer tray having an anti-jump baffle 7 and showing alternative types of perforation 10.

One area of variation in the structure of multiple downcomer tray is the arrangement of the openings provided in the bottom of the downcomer and which form a part of the sealable outlet means necessary at the bottom of the downcomer. The openings may be circular, square or elongated in either direction, that is, along the width or length of the downcomer means. Circular openings and elongated grooves extending between the side walls 6, sometimes referred to as louvers, as shown in FIG. 9 are preferred.

FIG. 5 illustrates an alternative configuration which is suitable as the liquid sealable means necessary at the bottom of the downcomer means. In this embodiment of the invention, a seal trough 16 is attached to the lower portion of the downcomer means 2 by the provision of short vertical legs 11 which may be bolted to the bottom end of the side walls 6 and to the sides of shallow trough 16. The space between the bottom edge 12 of the downcomer sidewall and the interior surface of the trough is left open for the passage of liquid. A minor seal difference provided by the elevation of the top of the trough above the lower edge of the downcomer together with the momentum of the descending liquid is sufficient to prevent the entrance of gas into the downcomer means. The entrance of gas into the downcomer means is always undesirable as it would allow gas to bypass the contacting area of the tray.

FIGS. 6 and 7 illustrate details of one embodiment of the vapor-directing slots 4. FIG. 6 shows the view looking across the directional slot with the circular perforations 9 being distributed across the decking material 3 while the slot 4 is formed in a section of the deck. The slot is formed by cutting and stretching the metal such that the slot raises at an angle a above the surface of the deck. The deck is normally mounted in an absolutely horizontal position in the fractionation tray when in use. The angle a is preferably between 5 and 45 degrees. FIG. 7 is a cross-section of the same small piece of decking material as FIG. 6 and shows the view looking into the opening of the slot 4. In this particular instance, it is seen that the slot is formed by a relatively flat upper surface which is connected to the tray by the sloping side surfaces.

The slots could be produced having alternative configurations. For instance, the overall shape of the top surface of the slot could be circular or elliptical when viewed looking into the opening as in FIG. 7. Although it is preferred that the top of the slot is connected to the decking by the sloping side surfaces, there is no requirement for effective vapor-directing slots to be so constructed. Therefore, the slots could be formed with the metal being cut along the sides of the slot in addition to being cut at the open front portion of the slot. Slots constructed in this manner are preferably relatively long such that only a minimal amount of the total gas volume passing upward through the slot may pass outward through the sides of the slot in a direction parallel to the downcomer means. It is preferred that the gases are allowed to pass upward through the tray in a very large number of flow-directing slots. A typical slot density will exceed about 24 individual slots per square foot of decking area.

The louvers, openings, or holes provided in the bottom of the downcomer means should be located such that the liquid exiting the openings will fall upon decking material rather than into the open upper end of the downcomer means located on the next lower tray. Allowing liquid to fall directly into the next lower downcomer is undesirable.

FIG. 9 is a more detailed view as seen looking downward into a portion of a fractionation column 1 employing a multiple downcomer tray of the subject invention. The tray itself extends outward to the inner surface of the vessel shell or outer wall of the column. A deck 3 extends from the inner surface of the vessel wall to the first downcomer 2. This portion of the tray surface contains vapor-directing slots which are oriented only towards this specific downcomer means. The portion of the tray surface located between this first downcomer means and the next inward downcomer contains vapor-directing slots oriented in opposite directions. Again, the slots are not drawn to scale in order to allow easier representation. This figure illustrates the view seen looking downward into a downcomer means 2 having an anti-jump baffle 7 aligned with the downcomer means and equidistant between the side walls 6. The anti-jump baffle is held in place and supported by the bracing bars 15 located along the length of the downcomer. This particular figure illustrates two alternative opening configurations in the bottom plate of the downcomer. The circular openings 10 are shown in one portion of the innermost downcomer while elongated louvers 10' are shown in another portion of this same downcomer and in the next inward downcomer. The openings are arranged in groupings corresponding to the presence of decking on the next tray downward in the column.

Figure 10:
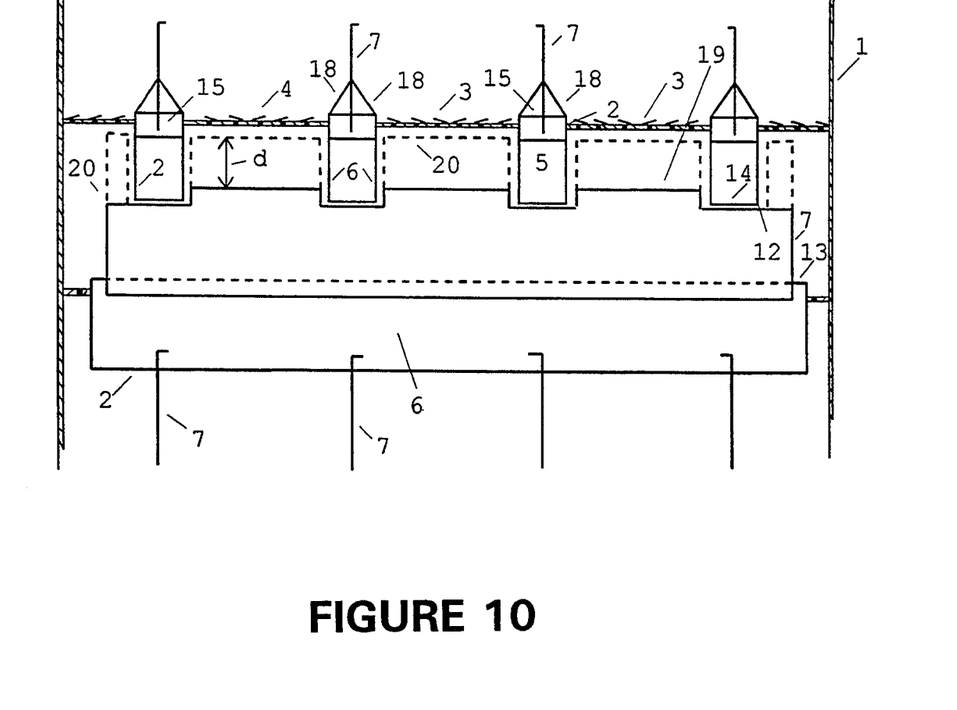
FIG. 10 illustrates an embodiment of the invention in which the anti-jump baffle extends upward above the bottom of the downcomer of the next-above tray.

FIG. 10 is a sectional view looking horizontally across a column 1 showing two vertically aligned fractionation trays each having four downcomers 2. The dimensions of this figure are approximately proportional to those of the second test apparatus described below. This figure illustrates the embodiment in which the baffle of the lower tray extends upward above the downcomer such that the upper edge 19 of the anti-jump baffle is above the bottom edge 12 of the downcomer sidewall, and hence above the bottom of the downcomer itself. In this embodiment the upper edge of the baffle of the lower tray, and those below it, are slightly notched to accommodate the downcomers. The upper edge of the anti-jump baffle of the uppermost tray is flat and preferably bent to provide a slight lip which increases the rigidity of the baffle. The upper edge of individual portions of the baffles on lower trays may also be lipped at the top. The lower edge of all of the anti-jump baffles is preferably straight and located at about the level of the tray decking.

The vertical distance "d" between the top edge of the anti-jump baffle and bottom surface of tray decking (between the downcomers) can be varied to a considerable extent. The upper edge of the anti-jump baffle preferably extends upward between the downcomers such that the distance "d" is substantially equal to the equivalent distance provided in the anti-jump baffle notch which surrounds the bottom of the downcomers. This maximum upward extension is shown on the figure by the hashed line 20 which follows the shape of the lower surface of the upper tray. The separation between the lower surface of the upper tray and the top edge of the anti-jump baffle would then be substantially uniform along the entire length of the anti-jump baffle. Alternatively, the maximum upward extension of the baffle may occur only along those longer portions of the baffle which are between downcomers, with the terminal portions being level with the portion under the downcomers. The anti-jump baffle may be attached to the downcomer to further stiffen the baffle.

FIG. 10 also shows an outline of a stiffening brace 15 which extends across the downcomer 2 and is notched to receive the lower edge of the anti-jump baffle 7. The bottom of the brace is therefore below the baffle and extends into the downcomer. The extension of the baffle 7 and braces 15 into the downcomer helps reduce turbulence in the downcomer and improve the separation of vapor and liquid.

Figure 11:
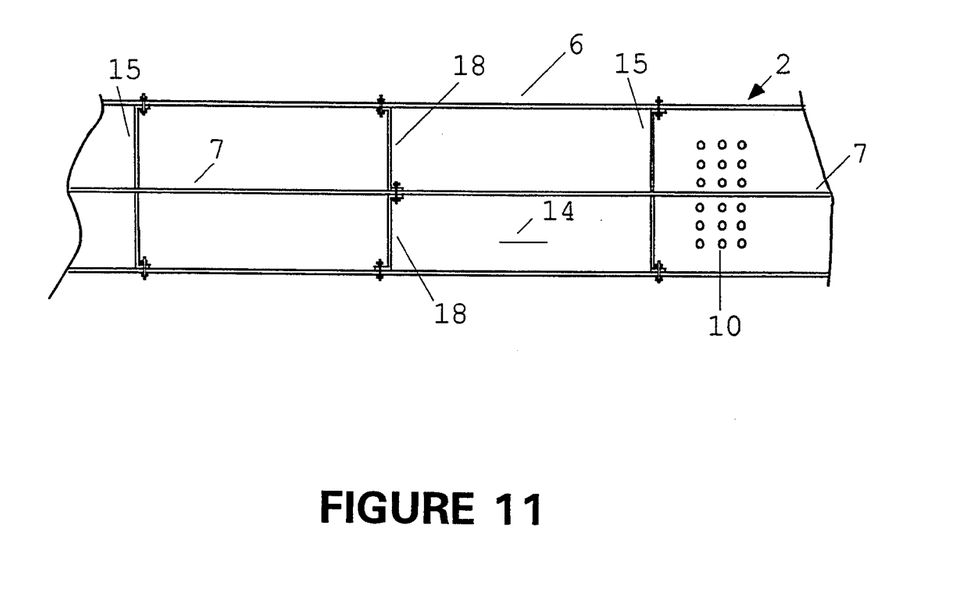
FIG. 11 is an overhead view of a section of a downcomer showing details of the bracing bar 15 and tapered brace 18.

FIG. 11 shows the details of the structural elements which are preferably employed to support the anti-jump baffle above the downcomer. These elements comprise the bracing bars 15 and the tapered brace 18. These elements alternate along the length of the baffle. The bracing bars 15 are preferably but not necessarily located entirely within the trough of the downcomer. The bracing bar configuration of this figure has a central notch which receives and surrounds a lower portion of the anti-jump baffle 7 thus preventing sideways motion and also supporting the baffle. The braces extend across the width of the downcomer and are attached to both downcomer sidewalls 6. The tapered braces 18 are used in pairs, with one brace being attached to each side of the anti-jump baffle. In the view provided by FIG. 10, the triangular profile of the top portion of these braces can be seen. These braces are intended to provide increased rigidity to the upper portions of the anti-jump baffle. FIG. 11 also shows a group of openings 10 in the bottom plate 14 of the downcomer.

One embodiment of the subject invention may be characterized as a tray useful in the fractional distillation of chemical compounds, the tray having a generally circular circumference and comprising at least three narrow, trough-like rectangular downcomers which are parallel to each other and equidistantly spaced across the tray, each downcomer being formed by two opposing side walls and two opposing end walls which are shorter than the side walls, the side walls and end walls extending perpendicular to the plane of the tray in both directions and having upper edges located on one side of the plane of the tray, each downcomer having a substantially open inlet and a liquid sealable outlet located on a second side of (below) the plane of the tray; a plurality of elongated vapor-liquid contacting decks, with a vapor-liquid contacting deck being located adjacent each downcomer means side wall such that the tray has one more vapor-liquid contacting deck than downcomer means, with uncovered symmetrical, preferably circular, perforations being evenly distributed across the vapor-liquid contacting decks and with the side walls of the downcomer means forming parallel liquid outlet weirs on opposite sides of the contacting decks; directional slots located on the vapor-liquid contacting decks and having openings facing the closest downcomer means, with the vapor-liquid contacting decks located between adjacent downcomer means having a first grouping of the slots being oriented in a diametrically opposite direction from a second grouping of slots; and, a liquid anti-jump means comprising at least one vertical plate extending vertically outward and above the inlet of the downcomer means and aligned parallel with the side walls of the downcomer means. This baffle may have one of the several forms described herein. The tray, in differing embodiments, can have one, two, three, four, five or more individual downcomers.

A more inclusive embodiment of the invention is a fractionation column comprising an enclosed cylindrical outer vessel having a plurality of the subject trays mounted therein, with the vertically adjacent trays (as defined by downcomer orientation) being perpendicular to each other. The overall apparatus would include the customary accessories for feeding the liquid and vapor streams to be contacted such as a reboiler and reflux system.

The subject trays, containing flow-directing slots and anti-jump baffles were tested in a number of experiments in two different apparatuses. The object of the experiment was to compare the subject trays to conventional multiple downcomer trays. The conventional trays contain only circular perforations with an open area roughly equal to the subject trays. For each tray type, the froth height was measured at different liquid rates and F-factors. The F-factor is defined as $v_s$ multiplied by the square root of $d_g/(d_l-d_g)$ where $v_s$ = air velocity based on bubbling area, $d_g$ = air density and $d_l$ = density of liquid (water). Thus, the froth heights could be compared at different F-factors to evaluate the froth height reduction capabilities inherent in the subject trays. These runs were also to evaluate and compare the vapor capacity of each tray type. The maximum vapor capacity is determined as the condition where the froth height reaches the tray above. This condition is termed the flood point of the tray.

The first test apparatus used was a square column with the dimensions being roughly 2 ft. by 2 ft. (0.61 m by 0.61 m). The apparatus uses air and water test fluids to test new ideas since its size allows changes to be made readily. The high vapor rates available in this column were used to evaluate and compare the froth heights and vapor capacity of conventional multiple downcomer trays and the subject multiple downcomer trays. The test column consisted of the trays with tray spacings of 38.1 cm (15 in). Each tray contained a single 12.7 cm (5 in) wide downcomer with a total of 0.29 m$^2$ (3.1 ft$^2$) of bubbling area. The total downcomer height was 16.5 cm (6.5 in) of which 3.8 cm (1.5 in) extended above the tray deck as an outlet weir. The decks were made of 0.19 cm (0.076 in) thick stainless steel and contained perforations with diameters of 0.476 cm (0.1875 in). For the slotted trays, the open area of each "C" slot was 24.4 mm$^2$ (0.038 in$^2$) and each tray contained a single 16.5 cm (6.5 in) high anti-jump baffle. The circular perforations of the subject trays were 14.2 percent of the tray deck active (bubbling) area, and the slots were 2.0 percent of the active area. The unslotted (conventional) trays had a 16.3 percent open area (circular perforations only).

The results of these tests revealed the slotted multiple downcomer trays significantly reduced the froth heights when compared to the unslotted multiple downcomer trays. At high vapor rates, the slotted trays reduced the observed froth height by about 8.4 cm (3.3 in). The decrease in froth height allows the subject trays to be operated at much higher vapor rates (i.e. F-factors). Thus, these experiments determined the subject trays with slots and baffles have a greater vapor capacity than the unslotted and unbaffled multiple downcomer trays.

The second apparatus enabled the subject trays to be evaluated on commercial scale equipment. This column is roughly eight feet in diameter and contains three trays at 30.5 cm (12 in) tray spacings. The trays contained four 12.7 cm (5 in) wide downcomers at total downcomer height of 16.5 cm (6.5 in). These downcomers extended above the tray decks by 2.54 cm (1.0 in). The slotted trays had 12.5 percent open area due to the circular perforations and a 1.8 percent open area due to the slots. Also, the trays contained 20.3 cm (8.0 in) high anti-jump baffles. The conventional tray open area was 14.4 percent (circular perforations only).

The eight-foot test column operates at atmospheric pressure and uses air and water as the test fluids. Test runs on the trays indicated the subject trays reduced the froth height considerably when compared to the conventional trays. A test at a liquid weir loading of 6.05 l/m sec (0.065 CFS/ft of weir), the slotted trays reduced the observed froth height by about 7.3 cm at height vapor rates. The results of these tests confirmed the earlier findings in the smaller test column. The subject slotted and baffled multiple downcomer trays have a higher vapor capacity than the conventional multiple downcomer trays due to the ability of the subject trays to reduce froth height. Flood points from the eight-foot column at various liquid flow rates are given in TABLE 1. The liquid flow rates are given in cubic feet per sec/ft of weir and in liters per sec/meter of weir. The F-factors of TABLE 1 represent the vapor rates where the froths on the trays completely filled the tray spacings. For liquid weir loadings up to 6.05 l/m-sec (0.065 CFS/ft), the subject trays were found to have a vapor capacity increase of 15 to 22 percent over the conventional multiple downcomer trays.

TABLE 1

| Liquid flow rate | | F Factor | |
|---|---|---|---|
| CFS/ft | ls/m | Conventional tray | Improved tray |
| 0.040 | 3.72 | 0.350 | 0.405 |
| 0.052 | 4.84 | 0.333 | 0.388 |
| 0.065 | 6.05 | 0.300 | 0.367 |

While not wishing to be bound to any particular theory, it is believed that the subject invention achieves its improved performance by imparting a net horizontal movement to the liquid droplets suspended above the tray deck. This movement is the result of momentum transfer from gases rising through the flow-directing slots to the suspended liquid droplets. A larger number of the droplets will therefore flow into the are above the open upper end of the downcomer while suspended and fall into the downcomer. The forth is in this manner more quickly removed from the tray surface.

It is also possible that the slots tend to cause the droplets to have a flatter (more horizontal) average trajectory and thereby impact with vertically rising droplets sprayed upward from the circular perforations. This could reduce the average height reached by the droplets having an initial totally vertical trajectory.

The increased performance of the subject trays has been verified in two additional tests performing actual separations. In a test performed at a university test facility using a 60 cm diameter column to separate methanol and water it was determined that the efficiency of the subject trays did not appear to be degraded as compared to prior art multiple downcomer trays.

A more convincing test result was obtained when the conventional multiple downcomer trays installed in a commercial fractionation column used to remove ethane from ethylene were replaced with the trays of the subject invention. This change allowed the column to be operated at 115 percent of its former capacity. Separation efficiency was not decreased. It is believed an even greater increase in capacity could have been achieved, but there was no additional column feed available.

What is claimed:

1. An apparatus for performing fractional distillation which comprises vertically aligned upper first and lower second vapor-liquid contacting trays, each tray having a generally circular circumference, and comprising:
   (i) at least two narrow, trough-shaped downcomers which are parallel to each other and equidistantly spaced across the tray, each downcomer being formed by two opposing side walls and two end walls which are shorter than the side walls, the side walls and end walls oriented perpendicular to the plane of the tray, each downcomer having a liquid sealable outlet means; and,
   (ii) a plurality of elongated vapor-liquid contacting decks, with a vapor-liquid contacting deck being located adjacent each downcomer side wall such that the tray has at least one more vapor-liquid contacting deck than downcomer means; with perforations being substantially evenly distributed across the entire surface provided by the vapor-liquid contacting deck and with at least a portion of said perforations being in the form of vapor flow directional slots having openings facing a downcomer side wall;

with the apparatus being further characterized in that the downcomers of the second tray are perpendicular to those on the first tray and in that each tray comprises a plurality of anti-jump baffles comprising a vertical plate centrally mounted over the downcomers of the tray parallel to the downcomer sidewalls, with the anti-jump baffles of the lower second tray having notches which surround the bottom portion of downcomers of the upper first tray.

2. The tray of claim 1 wherein the liquid anti-jump baffle extends into the downcomer of the lower second tray.

3. The apparatus of claim 1 further characterized in that the distance between the upper edge of the anti-jump baffle of the lower second tray and the lower surface of the upper first tray is substantially equal along those portions of the baffle which are under downcomers and those portions of the baffle which are between downcomes of the upper first tray.

4. The apparatus of claim 1 further characterized in that the distance between the upper edge of the anti-jump baffle of the lower second tray and the lower surface of the upper tray is substantially uniform along the length of the anti-jump baffle.

5. The apparatus of claim 1 further characterized in that each comprises at least three downcomers.

6. A vapor-liquid contacting tower comprising:
   (a) a cylindrical vessel; and,
   (b) the multiple downcomer trays as defined in claim 1.

7. The tower of claim 6 further characterized in that each tray has the same number of downcomer means.

8. An apparatus for performing fractional distillation which comprises vertically aligned upper first and lower second vapor-liquid contacting trays, each tray having a generally circular circumference, and comprising:
   (i) at least two narrow, trough-shaped downcomers which are parallel to each other and equidistantly spaced across the tray, each downcomer being formed by two opposing side walls and two end walls which are shorter than the side walls, the side walls and end walls oriented perpendicular to the plane of the tray, each downcomer having a liquid sealable outlet means; and (ii) a plurality of elongated vapor-liquid contacting decks, with a vapor-liquid contacting deck being located adjacent each downcomer side wall such that the tray has at least one more vapor-liquid contacting deck than downcomer means; with perforations being substantially evenly distributed across the entire surface provided by the vapor-liquid contacting decks and with at least a portion of said perforations being in the form of vapor flow directional slots having openings facing the closest downcomer side wall;

with the apparatus being further characterized in that the downcomers of the second tray are perpendicular to those on the first tray and in that each tray comprises a plurality of anti-jump baffles comprising a vertical plate centrally mounted over the downcomers of the tray parallel to the downcomer sidewalls, with portions of the anti-jump baffles of the lower second tray extending upward between downcomers of the upper first tray.

9. The apparatus of claim 8 further characterized in that the distance between the upper edge of the anti-jump baffles of the lower second tray and the lower surface of the upper first tray is substantially equal along those portions of the baffle which are under downcomers and those portions of the baffler which are between downcomers of the upper first tray.

10. The apparatus of claim 8 further characterized in that the distance between the upper edge of the anti-pump baffle of the lower second tray and the lower surface of the upper tray is substantially uniform along the length of the anti-jump baffle.

11. The apparatus of claim 10 further characterized in that each comprises at least three downcomers.

* * * * *